Dec. 23, 1952 D. M. BIRRELL 2,622,484
WORM GEAR CUTTING ATTACHMENT FOR MILLING MACHINES
Filed Jan. 25, 1950
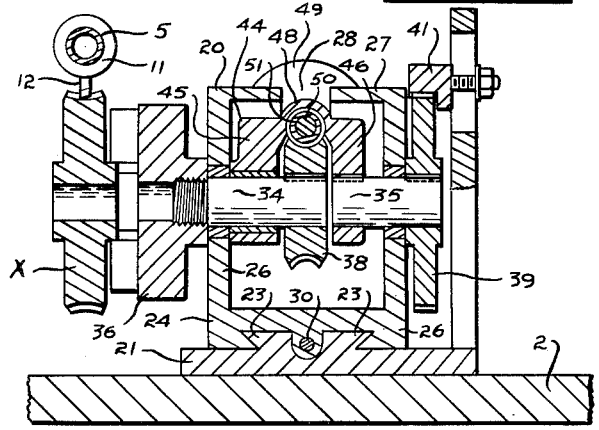
Fig. 2.
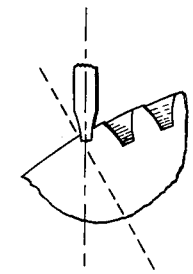
Fig. 3.
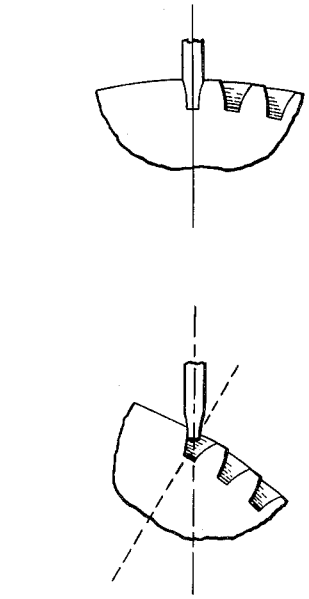
Fig. 4.
Fig. 5.
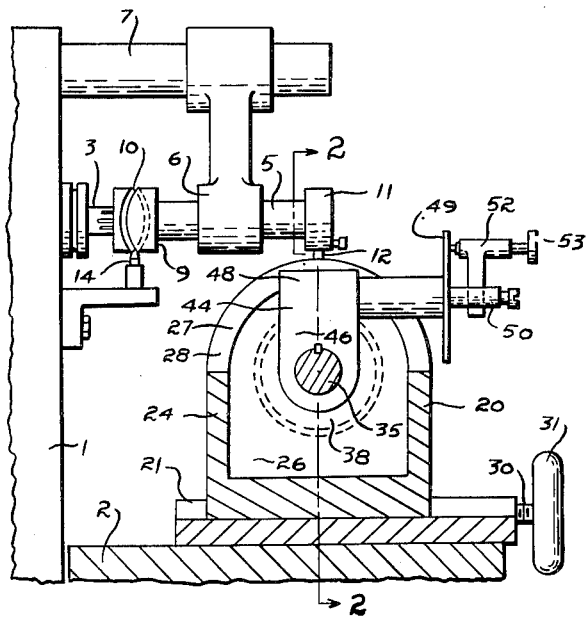
Fig. 1.
INVENTOR
DAVID M. BIRRELL
Ernest E Carver
ATTORNEY Patented Dec. 23, 1952

2,622,484

UNITED STATES PATENT OFFICE 2,622,484

WORM GEAR CUTTING ATTACHMENT FOR MILLING MACHINES

David M. Birrell, Johannesburg, Union of South Africa

Application January 25, 1950, Serial No. 140,385

1 Claim. (Cl. 90—3)

My invention relates to improvements in worm gear cutting attachments for milling machines.

The present invention is particularly adapted for use in conjunction with the device described in my pending application Serial Number 759,451, filed July 7, 1947, and now abandoned, which discloses a device for cutting worm gear teeth with a tool carried by a rotating spindle, such as that of a milling machine. In this pending application the gear blank is shown supported upon the table of the machine and no means are disclosed for rocking the said blank relative to the cutting tool as the cutting proceeds to give to said worm gear a proper involute tooth.

It is therefore the particular object of this invention to provide a device capable of holding, indexing and rocking the gear blank during the tooth cutting operation. A further object is to provide means whereby the blank on which teeth are to be cut needs but one vertical setting, so that when the first tooth is cut to depth the blank is turned to the extent of one tooth and groove by the dividing head and is subsequently turned while moving the axis of the blank along a horizontal plane to feed said blank to the tooth cutting tool.

Referring to the drawings:

Figure 1 is a side elevational view of the invention, part in section.

Figure 2 is a sectional view taken on the line 2—2 of Figure 1.

Figures 3, 4 and 5 are views showing the blank being rocked beneath the cutting tool.

In the drawings like characters of reference indicate corresponding parts in each figure.

The numeral 1 indicates a portion of a milling machine having a table 2 and above the table is a driven splined arbor 3. A sleeve 5 is mounted for endwise movement upon the arbor 3, the sleeve being journalled in a bearing 6 supported from an over hanging shaft 7. The sleeve 5 is provided at its inner end with a cylindrical drum 9 having a cam groove 10 formed in its periphery. The outer end of the sleeve 5 is fitted with a tool holder 11 in which a cutting tool 12 is set to extend radially therefrom. A roller 14 is supported from a stationary part of the milling machine 1, which roller rides in the cam groove 10 and causes the sleeve 5 and its parts to reciprocate as the arbor 3 rotates. The groove 10 is such as to move the cutting tool 12 the length of one convolution of the worm which is to be used in conjunction with the worm gear being cut and is so timed relative to the blank that the tool will, when passing below the centre of the arbor, cut a tooth groove conforming to the proper pitch of said worm. Obviously as the tool 12 swings rotationally above the arbor, it will move in an endwise direction opposite to its direction of travel when moving to cut. The tooth will obviously be shaped to conform to the worm to be used with the worm gear being cut. Obviously if the blank were provided with teeth made by a closely fitting cutter as above described, there would be no clearance for the worm wheel to rotate and clear the worm. Since clearance has to be provided, it has been a custom to make the grooves of a worm substantially wider than the teeth, which left the teeth somewhat weak. To overcome these defects, I support upon the table 2, a feed works 20 which consists of a bed 21 having longitudinally disposed guides 23 upon which a blank supporting traverse 24 is slidably mounted. The traverse has spaced side walls 26 embracing the guides 23 and has a curved top wall 27 which is provided with a transverse slot 28. A feed screw 30 having a hand wheel 31 is journalled between the guides and is operatively connected by appropriate means with the traverse to move it endwise of the guides.

Journalled in the side walls 26 of the traverse 24 are aligned shafts 34 and 35. The shaft 34 is fitted externally of the traverse with a face plate or chuck 36 upon which the gear blank to be cut is adapted to be carried and on the inner end of said shaft a worm gear 38 is keyed. The shaft 35 is fitted at its outer end with a gear wheel or master gear 39 which is adapted to mesh with a horizontal rack 41 supported from the bed 21 above the gear 39, and extending lengthwise of the path of travel of the traverse. The master gear must have a pitch diameter equal to that of the worm gear to be cut and it is therefore necessary that the rack 41 should be made adjustable for height above the bed 21. The shafts 34 and 35 are connected together with a sleeve block generally indicated by the numeral 44, which consists of spaced portions 45 and 46 connected by an elongated bridge piece 48. The portion 45 is freely rotatable about the shaft 34 and the portion 46 is keyed to the inner end of the shaft 35. The bridge piece extends through the slot 28 in the top wall of the traverse and is fitted on its outer end with an apertured dividing plate 49 and is bored to receive an indexing spindle 50. The indexing spindle is fitted at its inner end with a worm 51 engaging the worm gear 38 and is fitted at its outer end with a crank arm 52 which carries a conventional slip pin 53 for engaging the dividing plate.

A dividing mechanism is thus formed with which to advance the gear blank X from one tooth position to another by moving the shaft 34 rotationally a predetermined distance with respect to the shaft 35.

The operation of the device is as follows:

A master gear 39 of appropriate pitch diameter is secured to the shaft 35 and a gear blank is fitted in the chuck 36 and the cutting tool 12 is set in motion. The traverse 24 is moved by manipulating the hand wheel 31 of the feed screw to bring the blank towards the path of the cutting tool. The table 2 will have been raised or lowered so that when the vertical axis of the blank is directly below the cutting tool, said tool will be cutting to depth. The movement of the traverse will cause the blank to reach and come into engagement with the cutting tool with the tool at a tangent to the blank, the depth of cut will increase as the traverse carries the rotating blank to a position vertically below the tool and when that point is passed the tangent of tool to blank will be reversed and will decrease until the blank has moved out of cutting engagement and the groove cut will be completed. When one tooth groove is completed, the traverse is moved back to starting point with the blank clear of the tool and the slip pin 53 of the dividing head is withdrawn and moved to the next tooth spacing of the dividing plate 49, thus advancing the blank rotationally one tooth in its position relative to the cutting tool. The above action is repeated for each tooth or groove to be cut and when completed, the gear will be provided with true involute teeth which will make proper operating engagement with the operating length of the worm by which it is driven.

What I claim as my invention is:

Gear cutting mechanism having means for supporting a worm wheel blank in cutter engaging position upon the table of a machine fitted with a rotating cutting tool having reciprocatory axial motion conforming to the lead of the mating worm, said means comprising a bed adapted for mounting on the machine table, a traverse mounted for movement in a plane parallel to the axis of the cutting tool, a shaft journalled in the traverse, means for mounting a worm wheel blank upon said shaft to be engaged by the cutting tool, a second shaft aligned with the first shaft, said first named shaft having a worm gear wheel, a member having spaced sleeves connecting said shafts, one of the sleeves being journalled on the first shaft and the other sleeve being secured upon the second shaft, a bridge piece connecting the sleeves, a worm shaft extending lengthwise of the bridge piece and in mesh with the worm gear, means carried by the bridge piece for indexing the worm shaft, and means for rotating the shafts in response to movement of the traverse.

DAVID M. BIRRELL.

REFERENCES CITED

The following references are of record in the file of this patent:

UNITED STATES PATENTS

| Number | Name | Date |
| --- | --- | --- |
| 1,438,528 | Jones | Dec. 12, 1922 |
| 1,438,529 | Jones | Dec. 12, 1922 |
| 1,469,051 | Poitras | Sept. 25, 1923 |
| 2,002,644 | Pohl | May 28, 1935 |
| 2,161,897 | Klomp | June 13, 1939 |